Feb. 22, 1949. W. G. WILKINSON 2,462,150
APPARATUS FOR MAKING AXONOMETRIC DRAWINGS
Original Filed Dec. 15, 1944 4 Sheets-Sheet 1

INVENTOR.
WALTER G. WILKINSON
BY
*Donald W. Farrington*
ATTORNEY

Feb. 22, 1949.  W. G. WILKINSON  2,462,150
APPARATUS FOR MAKING AXONOMETRIC DRAWINGS
Original Filed Dec. 15, 1944  4 Sheets-Sheet 2

INVENTOR.
WALTER G. WILKINSON
BY
*Donald W. Farrington*
ATTORNEY

Feb. 22, 1949. W. G. WILKINSON 2,462,150
APPARATUS FOR MAKING AXONOMETRIC DRAWINGS
Original Filed Dec. 15, 1944 4 Sheets-Sheet 4
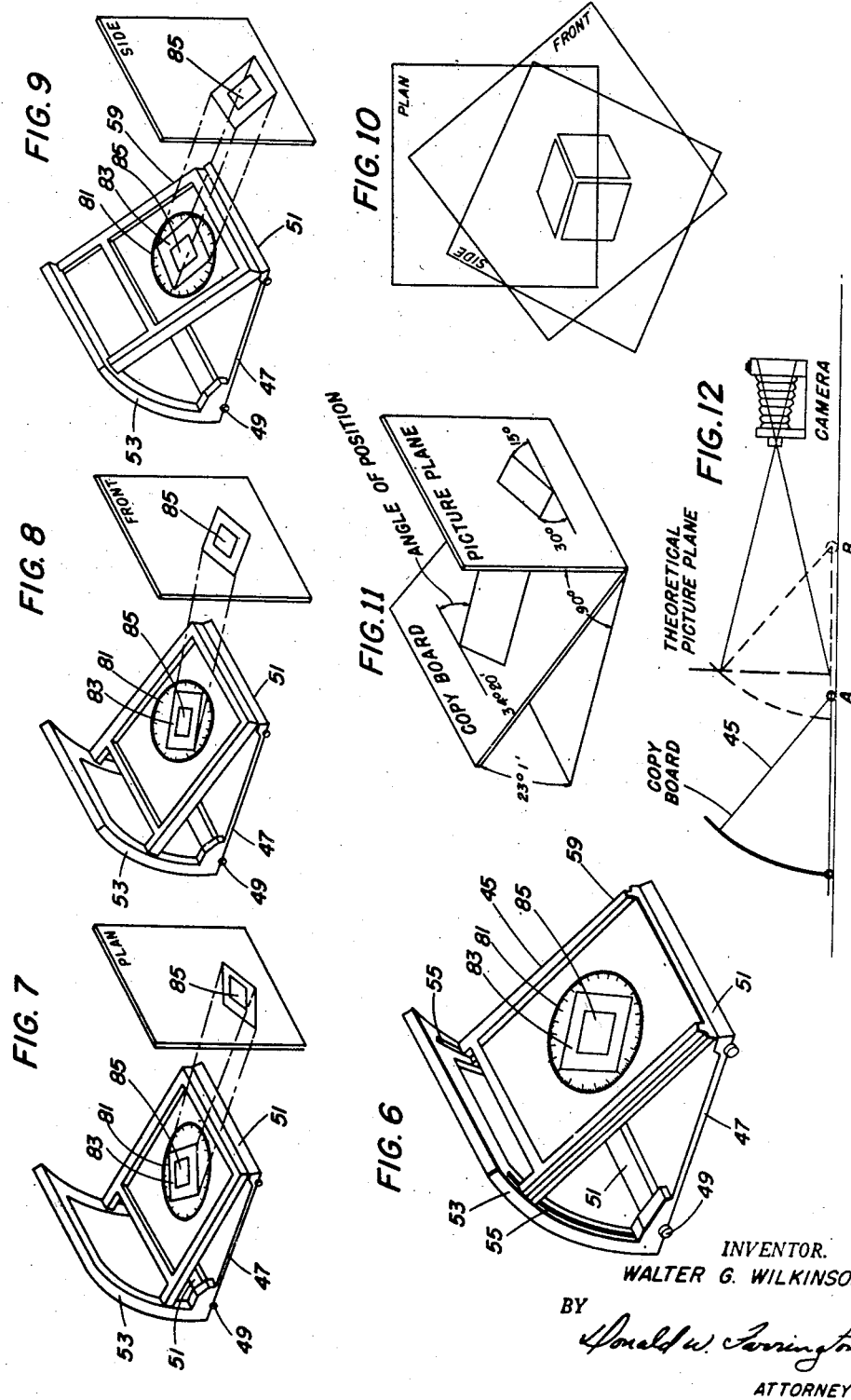
INVENTOR.
WALTER G. WILKINSON
BY
Donald W. Farrington
ATTORNEY Patented Feb. 22, 1949

2,462,150

UNITED STATES PATENT OFFICE 2,462,150

APPARATUS FOR MAKING AXONOMETRIC DRAWINGS

Walter G. Wilkinson, Woodlawn, Md., assignor to The Glenn L. Martin Company, Middle River, Md., a corporation of Maryland Original application December 15, 1944, Serial No. 568,243. Divided and this application October 12, 1945, Serial No. 621,892

5 Claims. (Cl. 88—24)

1

This invention relates to a system for producing illustrations or pictorial representations and more particularly to a method and apparatus for producing axonometric drawings from orthographic drawings. This application is a division of Serial No. 568,243, filed December 15, 1944.

The problem of representing an object in space is most easily solved when the object exists, by a photograph, but where it is desirable to create a representation of an object by a drawing, many acceptable forms of illustration may be employed ranging from free hand sketches, through carefully prepared perspective drawings, to the simple three-view orthographic drawing.

For a clear understanding of this invention, it is necessary that the meaning of drawing terms as used in this specification be clearly understood. Any standard textbook on engineering drawing, of which the works of Thomas E. French are probably best known, will set forth a classification of the types of projections used to represent three dimensional objects. Orthographic projection is the conventional front, top and side views usually employed by engineers and draftsmen to represent objects. Such orthographic views illustrate projections of faces of the object and are convenient for purposes of dimensioning, and because the views represent true lengths of lines, accurate drawings of this nature can be scaled. Such orthographic drawings are not pictorial in that they do not represent the object as it appears to the eye, so that other types of projections are required to illustrate objects as they appear in space.

The most common pictorial representation is a perspective drawing of an object. Perspective drawings involve two or three vanishing points and the dimensions on front, top and side planes of the drawings progressively decrease to the vanishing points on the drawing. A perspective drawing comes the closest to being a photographic reproduction of an object in the space and to the eye appears most illustrative because the object appears in three dimensions exactly as it would appear in space to the eye. Such drawings are very difficult to produce and require artistic ability and talent not usually found in the engineering draftsmen who can make orthographic projections. Because of the great skill required in making perspective drawings coupled with the labor involved, due to the non-uniformity of dimensions, other types of projections have been resorted to which are known as isometric, dimetric and trimetric projections which are all known under the generic term "axonometric projection."

2

All the above mentioned types of drawings or projections for illustrating an object in space are used under certain circumstances but the orthographic projection, because of its ease of production and the facility with which it may be scaled and dimensioned, is by far the most widely used. An orthographic drawing is least illustrative of what the object looks like and must be studied with a good deal of ability and skill to enable one to visualize a three dimensional object as illustrated by orthographic projection.

Isometric drawing is commonly employed to represent objects and has the advantage of being of the same scale along the three major axes because the dimensions are equally foreshortened along these axes. For some objects, isometric drawings make fair pictorial representations but if the object gets to be of any considerable size, the lack of perspective becomes readily apparent and the isometric drawing quickly becomes distorted and the purpose of utility of such drawing decreases accordingly. Similar objection can be made to dimetric projection coupled with the confusion that arises out of one of the axes making an unequal angle with the plane with the projection and therefore being to an odd scale. But again, on large scale figures the object represented quickly shows appearances of distortion.

The closest approach to the best pictorial representation of an object is trimetric projection, that is, projection in which the three principal axes make unequal angles with the plane of projection. In trimetric projection it is possible to select the proper angles of the principal planes of the object in space with the plane of projection and calculate the degree of foreshortening for each principal action of projection. When proper angles and scales have been selected, drawings made on these principal axes more closely represent a perspective drawing. Such a drawing will represent an object in space most truly as it will appear to the eye and will not show evidences of distortion for large objects drawn to relatively large scales. Such drawings have the advantages of perspective drawings, but the scale along any one line is uniform. Trimetric drawings may be scaled along the principal axes which is advantageous in both making such drawings and in using the same. A perspective drawing has to be drawn in its entirety in one drawing whereas a trimetric or axonometric drawing can be made in sections and pieced together. The principal disadvantage of axonometric drawing and its most complicated but most desirable subdivision, trimetric drawing, is that careful check must be kept at all times of three different angles of orientation of lines as well as three separate scales of dimensions along the principal axes.

The invention of this application simplifies the making of axonometric drawings and renders this type of illustration quite feasible for the making of production illustrations from engineering drawings.

The method of making axonometric or trimetric drawings set forth in this application overcomes the principal difficulty hitherto encountered in the production of scalable pictorial representations that can be made in large quantities and used in production illustration work. Production illustration is a system of engineering drawings in pictorial form that has come into prominence and proved its value in industry with the increased demands upon industry of more production with less skilled labor. The purpose of production illustration is one of expediting engineering design and facilitating high speed manufacturing through the presentation of complex engineering drawings in an easy-to-understand form. Originally this type of drawing was intended as a supplement to the engineering drawings for a large class of the manufacturing personnel who find it difficult to read any engineering drawing expressed in the normal orthographic views. However, through use and further development of this type of drawing, it is now obvious that production illustrations or trimetric projection can be used to advantage in new design, in redesign and to a great advantage in checking the regular engineering drawings expressed in orthographic projection.

Although these advantages of production illustration have been sufficient to warrant a rapid growth and wide spread usage, there is a serious disadvantage of the lack of practical basis for a system of preparing production illustrations. Before the system of the present invention, where production illustration or pictorial representations were required in engineering work, production work, illustrated hand books, catalogues, advertising or sales drawings, it was necessary to employ skilled artists to prepare pictorial representations which were slow in preparation and expensive but which could convey the representations of the object in space intended. The desirability and utility of such a form of illustration is universally admitted but it remained an unsolved problem until the present invention to produce quickly and inexpensively in a semi-mechanical form axonometric views from orthographic views which could be combined to produce axonometric or trimetric drawings for purposes of production illustration.

Essentially the present method of production illustrations consists in preparing a series of axonometric views derived from conventional orthographic views by means of the novel photographic apparatus forming a part of this invention. The orthographic views of the object are tilted at the desired angle of slant and angle of position with relation to the axis of inclination of the vertical picture plane in front of a camera and thereafter the orthographic views are progressively moved through the vertical picture plane in a direction parallel to the axis of the camera whose field is masked in such a manner that only the increment of the orthographic view on the line of intersection of the plane of the view and picture plane is progressively recorded on the film of the camera. The individual axonometric views so produced may then be correlated to produce a composite production illustration.

While the system of trimetric projection does not replace the conventional orthographic production of detailed drawings for manufacturing operations, it is of inestimable assistance to assembly workers, as it splits up and simplifies the assembling of complicated structures, and ordinarily these trimetric drawings are prepared following the production of regular orthographic projections of the detailed parts and thus the orthographic drawings are normally available for the making of axonometric prints therefrom. In addition, the axonometric system here described may be used for design work as distinguished from producing production illustrations. The making of axonometric photographs of the orthographic drawings is accomplished by means of novel photographic apparatus, as illustrated in the several sheets of drawings accompanying this specification.

In the drawings:

Figure 6 is an enlarged view of the copy board holder;

Figures 7, 8 and 9 are diagrammatic showings of axonometric projections with different copy board angles of slant and position for the projection of plan, front and side views of a cube;

Figure 10 is a diagrammatic illustration of the plan, front and side views combined to produce an axonometric drawing of a cube;

Figure 11 is a diagrammatic view of one form of projection of a trimetric cube on a vertical picture plane; and Figure 12 is a diagrammatic view of the axonometric photographic apparatus showing the movement of the copy board through the theoretical picture plane of the camera.

Figure 1:
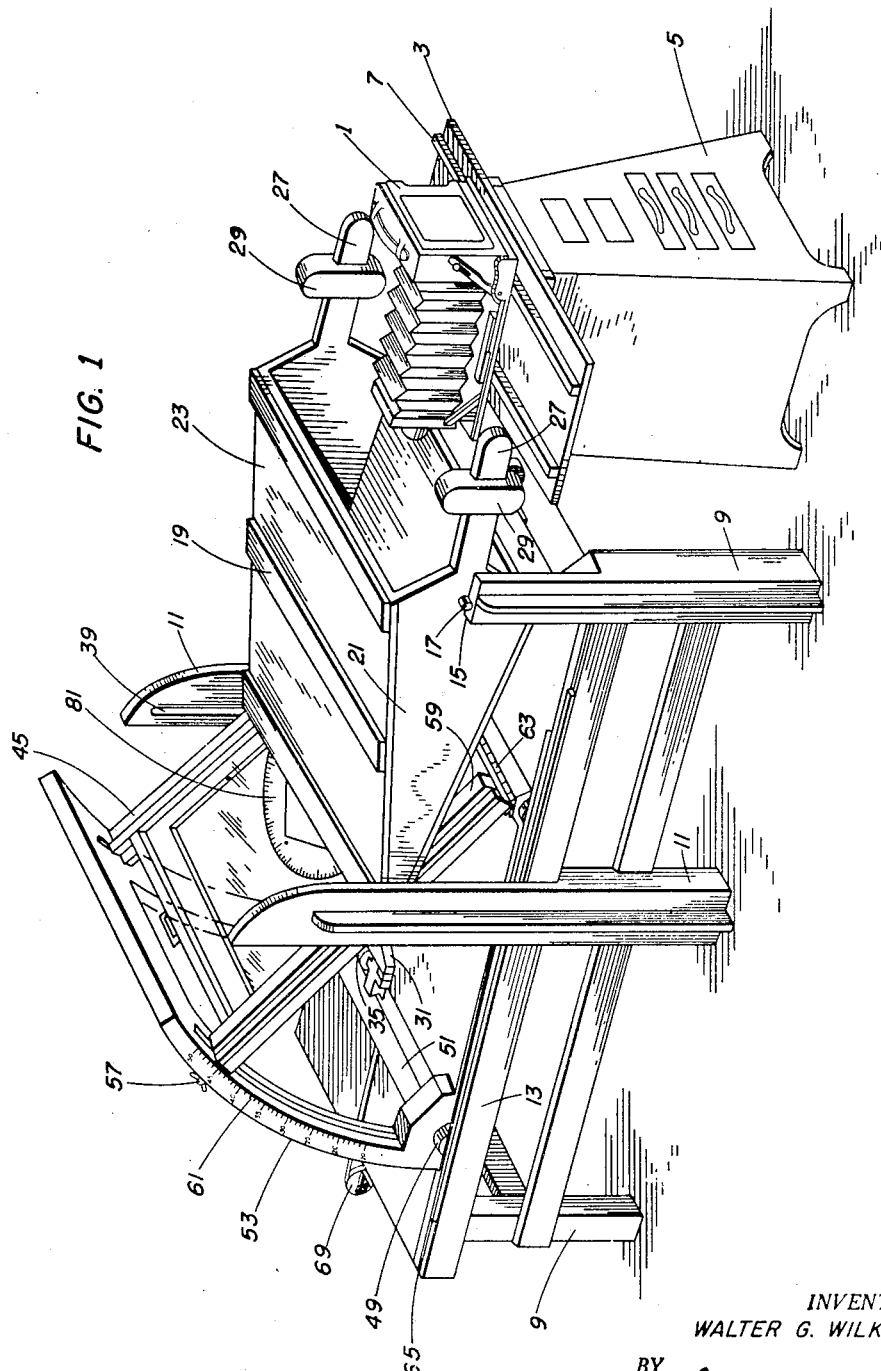
Figure 1 is an illustration of the entire apparatus for which the name "Axonograph" has been adopted.
Figure 2:
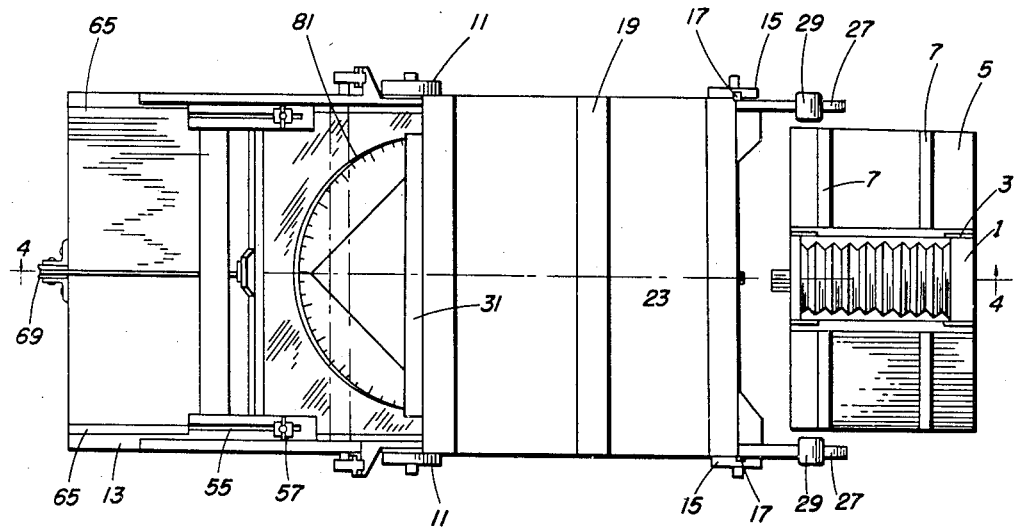
Figure 2 is a top plan view of the apparatus showing the arrangement of the several parts thereof.
Figure 3:
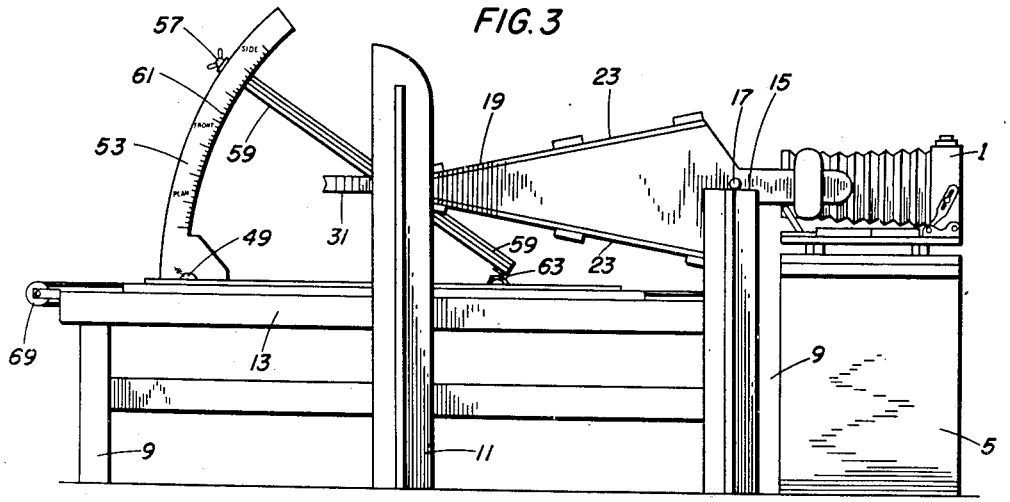
Figure 3 is a side elevation of the complete machine.

In carrying out the present method of producing photo-axonometric production illustrations, an orthographic view or drawing of the particular part is set up on the copy board of the photo-axonometric apparatus, which has been named the "Axonograph" and the position and focal length of the camera adjusted to give the proper scale of the drawing required. It is of importance that the angle of the copy board be adjusted to precisely the angle of the plane necessary to produce a trimetric photograph. In a trimetric projection with one axis vertical and an axis at 120° to the vertical, the copy board angle is 23°1' for a projection on the plan plane (see Fig. 11); 31°10' for the front plane; and 49°21' for the side plane. Inasmuch as horizontal lines are projected in true proportion when the drawing is in a horizontal position, the scale can be determined by measuring directly on the ground glass of the camera. After the camera is focussed, the drawing is positioned on the copy board by rotating the same so that the drawing is positioned on the board at a predetermined angle from the horizontal, depending on the plane in which the projection is being made. This angle is 34°20' for the plan plane (see Fig. 11); 27°21' for the front plane; and 37°14' for the side plane. A proper light is used and the camera sees the drawing through a narrow slot moving from the top to bottom of the copy board as the mouth of the funnel scans the entire drawing and the camera records the axonometric projection on the sensitized paper used, which is then developed in the customary manner.

One form of apparatus for carrying out this method of axonometric production illustration is shown in the accompanying drawings, where a camera 1 of conventional design and size is mounted on a base 3 supported on a movable stand or pedestal 5. Camera 1 may be mounted on tracks 7 for transverse adjustment and the stand moved forward or backward as conditions warrant. Mounted adjacent camera stand 5 is a rectangular floor-supported frame forming a horizontal bed supported on end posts 9, 9' and oppositely positioned central posts 11. The side rails 13 secured to the posts 9 and 11 form the tracks for the movable copy board as will be described in detail hereinafter. The end posts 9 of the frame adjacent the camera are elevated above the side rails 13 and terminate in flat upper bearing surfaces 15 on which rollers 17 extending laterally from the sides of a pivoted funnel member 19 are loosely supported. The funnel or scanning member 19 may be of any suitable opaque material, such as wood, metal or fibre board, and is provided with forwardly extending tapered sides 21 and top and bottom members 23 so that the forward end of the funnel terminates in a narrow transverse slot 25. The lips of the funnel 19 and slot 25 move in a vertical plane due to the fact that rollers 33 are restrained by grooves 39. The motion of the end of member 19 is caused by rollers 33' moving on the face of the copy board frame. Therefore, it will be seen that if the camera is focused on that portion of the copy board that the camera sees through slot 25, the picture plane of the camera will be in a vertical plane parallel to grooves 39. In other words, the picture plane of the camera will be an imaginary plane extending parallel with the guide grooves 39 through the intersection of the copy board and the line of sight of the camera through the slot. The open rear end of the funnel is supported on the pivot rollers 17 carried on the top surfaces 15 of the corner posts 11 and to counterbalance the weight of the funnel assembly 19, the sides 21 thereof are extended rearwardly and terminate in bars 27 having adjustable counterweights 29 thereon.

Figure 5:
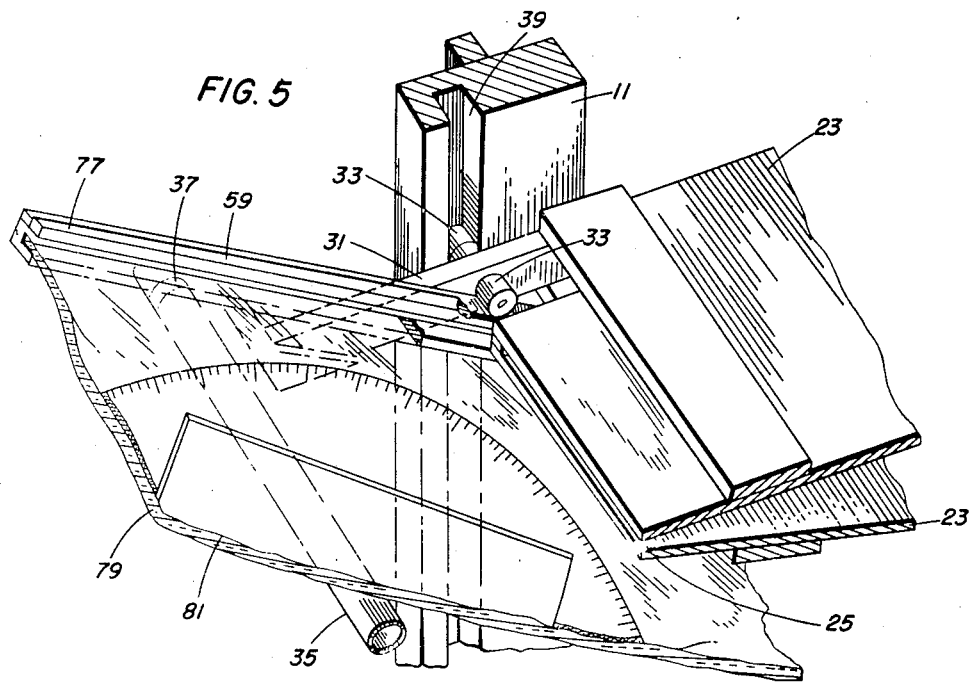
Figure 5 is an enlarged fragmental view illustrating the connection of the copy holder, scanning funnel and vertical guides therefor.

As shown in Figure 5, the width of the scanning slot 25 of the funnel 19 is somewhat less than the over-all width of the top and bottom members 23 to accommodate the forwardly extending side bars 31 affixed to the sides 21 of the funnel and to permit the mounting of rollers 33 journalled on pins passing through the side bars 31. The side bars 31 extend beyond the narrow end opening 25 of the funnel, and form supports for the ends of a tubular source of illumination 35 which is mounted in sockets 37 on the ends of the side bars 31, so that when the tube 35 is energized the entire length of the slot 25 is illuminated. The pair of rollers 33 secured to the side bars ride in vertical slots or guides 39 formed in the central frame supporting arms 11. The inner rollers 33' are adapted to roll or slide on the upper surface of side frames of a copy holder assembly 45. The elongated source of illumination 35 is positioned by this construction underneath the transparent copy board hereinafter described. The light source is thus held in fixed relation to the center of the funnel opening 25 and consequently uniform illuminations of the funnel is accomplished.

The construction of the movable copyholder assembly 45 is shown in detail in Figure 6. Here a horizontal frame or cart 47 is mounted on rollers 49 secured to the outer ends of front and rear bars 51. The rear bar 51 carries an upstanding arcuate frame 53 having vertical slots 55 formed in the arcuate members for passage of set screws 57 fastened in the outer ends of the side bars of pivoted frame 59, whereby the angle of slant thereof is adjustable relative to the arcuate frame 53. Suitable indicia 61 are preferably marked on the outer side of the arcuate members 53 to assist in positioning the outer end of the pivoted frame 59.

The lower end of the pivoted frame 59 is hinged at 63 to the front cross bar 51 of the cart and the rollers 49 thereof run in longitudinal slots 65 formed in the top surfaces of the side rails 13 of the frame bed. Longitudinal movement of the copy board cart 47 toward the funnel 19 is secured by securing a cable 67 to the cross bars 51 and driving the cable over end pulleys 69 and 71 through the medium of an intermediate power pulley 73 driven by motor 75. Thus, the cart 47, when moved by the power cable is shifted along the slots or track 65 and raises or lowers the front end of the pivoted funnel 19 so that the narrow slot or orifice 25 thereof scans the surface of the pivoted frame 59. This is accomplished by the pairs of rollers 33 secured to the side bars 31 of the funnel 19 rising or falling in the vertical guide slots 39 of posts 11 with the inner rollers 33' of each pin riding on the side members 77 of the pivoted frame 59.

A glass or other light transmitting sheet 79 is mounted in the frame 59 for supporting a protractor 81 on which an orthographic drawing 83 to be photographed is mounted. The angle of position of the drawing or photographic plate may be readily adjusted by the markings on the protractor.

While the apparatus herein disclosed provides for the illumination of the drawing or photographic plate held on the drawing board by transmitted light from the light source 35 on the under side of the drawing or plate, as this has been found to be a convenient arrangement, it will be understood that the copy holder glass 79 may be used to support drawings which can be illuminated by reflected light.

In operation the orthographic view to be photographed is placed on the protractor disc 81 which is illuminated from below and across its entire width by the tubular light source 35. Thumb screws 57 are then adjusted to place the copy holder frame 59 and drawing mounted thereon at the proper angle of slant by loosening the thumb screws and manually setting the copy frame 59 in accordance with the scale 61 on the arcuate end of the frame. The angle of position of the orthographic drawing to be photographed is determined by the setting or adjustment of the protractor 81 and the precise angle thereof may be any one of twelve different positions, as the vertical axis of the cube representation may be in 15°–30°, 15°–45° or 30°–45° positions.

Figure 4:
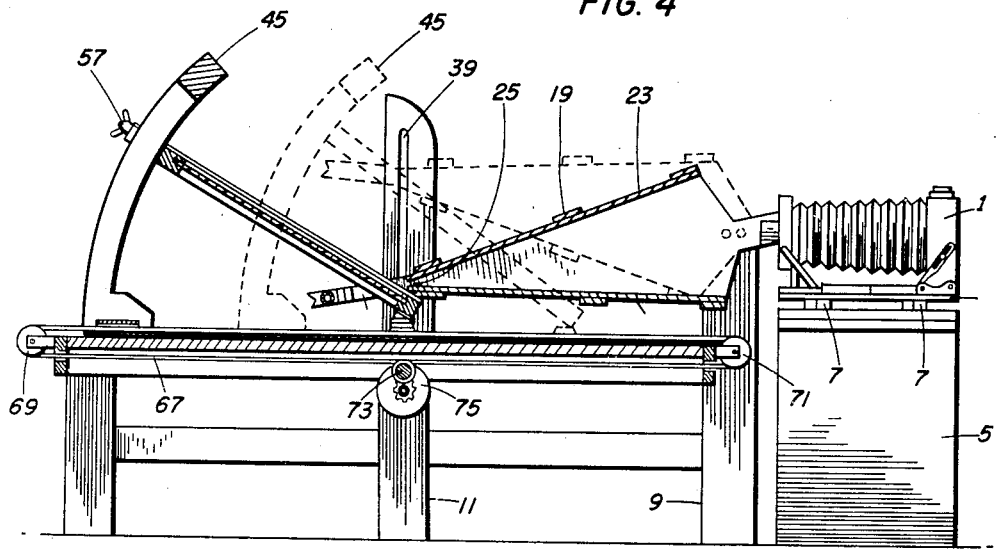
Figure 4 is a vertical section taken on line 4—4 of Figure 2, showing the movement of the copy board assembly and scanning funnel of the photographic apparatus in dotted lines.

The camera, being loaded with sensitized film or paper, is then ready to photograph the view in position on the copy board by scanning the same, that is, photograph a thin transverse section of the orthographic view as it is passed through the picture plane of the camera as viewed through the opening 25 of the funnel 19. The motor 75 is operated to place tension on the cable 67 attached to the lower end bar 51 of the cart 47 and move the copy board assembly bodily, as shown in Figure 4 of the drawings, from the solid to the dotted line positions or vice versa. By reason of the transverse rollers 33 attached to the side bars 31 and the sides of the funnel 19 riding in the vertical guides 29 and with the inner ends thereof movable on the side rails 77, the funnel opening 25 scans the view on the copy holder assembly and thus progressively photographs and records the axonometric projection thereof on the sensitized film or paper, which is then developed in the manner of an ordinary photograph. It should be noted that during this scanning movement the funnel pivot rollers 17 supporting the funnel also move slightly on the top surface 15 of the legs 9, and due to the counterweight construction previously described readily permits the funnel member to raise or lower in parallel relation to the picture plane of the camera in accordance with the position of the movable copy board assembly.

In Figures 7, 8 and 9 the manner of adjusting the copy holder to secure the desired angle of slant and angle of position is shown. For simplicity a cube 85 is drawn or photographed on a sheet or plate 83 and the sheet or plate mounted on the protractor disc 81, which may be rotated to position the drawing of the cube at the desired angle of position. Suitable indicia or markings are provided to insure accurate setting of the protractor with relation to the axis of the recording camera 1. As shown, Figure 7 illustrates the setting of the copy holder for projecting a plan view of a cube in axonometric projection, Figure 8 illustrates the projection of a front view and Figure 9 the side view thereof. In Figure 10 the several axonometric views are shown in correlated arrangement forming a production illustration. Axonometric drawings or production illustrations are produced by draftsmen of ordinary skill by using the axonometric views obtained as above described. Anywhere from one to three views of an object may be employed to produce the axonometric drawing. In some cases a plan view of a thin irregularly contoured object may be sufficient, as the thickness may be drawn in from the single axonometric view. In other cases, the plan axonometric view may be required as a locating view and front and side views built upon the plan view. The views are guides to positions and shapes of portions of objects and extremely accurate results with amazing speed can be obtained in the final illustration. As before stated, the views thus projected are scale drawings and through the use of properly designed trimetric templets, underlays and protractors, a draftsman may readily complete a production illustration drawing from one or two of the axonometric projections.

Figures 11 and 12 are diagrammatic disclosures of several principles of this invention. In Figure 11 there is shown the theoretical vertical picture plane of the camera denoted as PP with relation to the axis of inclination or slant of the copy holder set at 23°1' to the horizontal plane. The angle of position of the square is 34°20' whereby the axonometric projection on the vertical picture plane PP is a parallelogram whose sides are at angles of 15° and 30° to the horizontal. Adjustment of the angle of inclination PI or the angle of slant and the angle of position of the square thereon produces the other desired trimetric projections and similarly any face of any object in any axonometric projection is obtained.

Figure 12 shows the movement of the adjustable copy board assembly 45 travelling forward from position A to position B through a theoretical picture plane PP in a direction parallel to the axis of the photographic recording camera 1. The funnel or scanning device heretofore described masking the field of the camera and permitting the progressive recording of only an increment of the orthographic view on the line of intersection of the angle of slant and angle of position as the views move through the picture plane thereof.

It is to be understood that certain changes, alterations, modifications and substitutions can be made without departing from the spirit and scope of the appended claims.

I claim:
1. A photographic apparatus for recording an axonometric projection comprising an adjustable copy board having an orthographic view positioned thereon at a predetermined angle relative to the picture plane, a camera spaced from the copy board and an intermediately positioned scanning device adapted to restrict the vision of the camera, and means for simultaneously moving the said copy board in a direction parallel to the axis of the camera as said scanning device moves parallel to the picture plane of the camera to scan increments of said copy as said increments pass through said picture plane, while said camera is maintained in a fixed position relative to said picture plane.

2. A photographic apparatus including a recording camera, a masking member arranged adjacent the lens of the camera, said masking member having formed therein a substantially narrow slot, an adjustable copy holder having an adjustable protractor thereon for supporting a drawing to be copied at a predetermined angle relative to the picture plane, motor means for moving said copy holder in a direction parallel to the axis of the camera and simultaneously moving the transverse slot over the surface of the copy holder during its movement to scan increments of said copy as said increments pass through said picture plane, while said camera is maintained in a fixed position relative to said picture plane.

3. A photographic copying apparatus including a camera, a masking shield movably mounted in the field of said camera to restrict the normal field thereof to a substantially narrow band, a copy holder for supporting a drawing to be copied at the desired angle of slant and angle of position with relation to the optical axis of the camera and means for simultaneously moving the drawing supporting surface of the copy holder through the picture plane of the camera and moving the masking shield parallel thereto to photographically scan increments of the drawing as said increments pass through said picture plane, while said camera is maintained in a fixed position relative to said picture plane.

4. A photographic copying apparatus including a copying camera, a movable scanning device having a slot formed therein arranged in front of said camera to restrict the camera field to only an increment of its normal field, a copy board for retaining an orthographic view thereon at a desired angle of slant and position with relation to the optical axis of the lens of the camera and means for moving the copy board through the picture plane in front of the camera in a direction parallel to the axis of the camera, so that said scanning device scans an increment of said orthographic view as it passes through the picture plane, said camera being maintained in a fixed position relative to said picture plane.

5. A photographic copying apparatus including a recording camera, a member having a narrow slot movably mounted in front of said camera, a copy-holding panel positioned in front of the slot of said member for holding copy to be photographed at a predetermined angle relative to the picture plane, means for illuminating said copy and means for moving said copy-holding panel through the picture plane of said camera, and simultaneously moving the slot of said member across the copy-holding panel to scan increments of said copy as said increments pass through said picture plane while said camera is maintained in a fixed position relative to said picture plane.

WALTER G. WILKINSON.

REFERENCES CITED

The following references are of record in the file of this patent:

UNITED STATES PATENTS

| Number | Name | Date |
| --- | --- | --- |
| 1,528,021 | Janzer, Jr. | Mar. 3, 1925 |
| 1,906,973 | Kingsbury | May 2, 1933 |